No. 870,557. PATENTED NOV. 12, 1907.
F. HAUS.
PIPE COUPLING.
APPLICATION FILED JUNE 30, 1904.
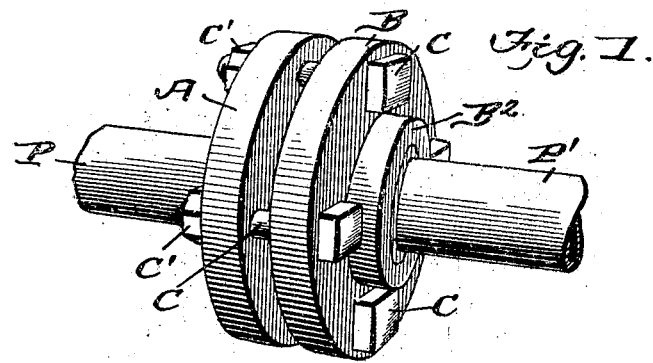
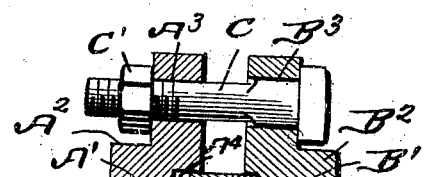
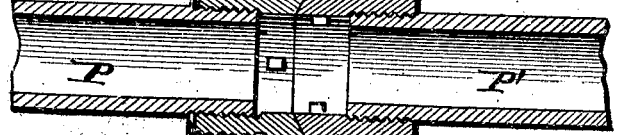
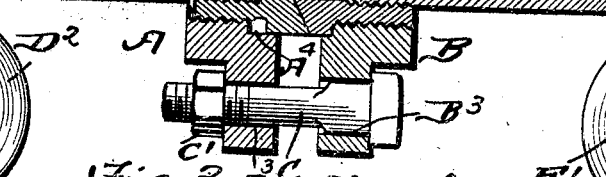
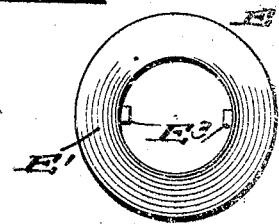
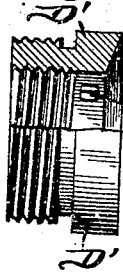
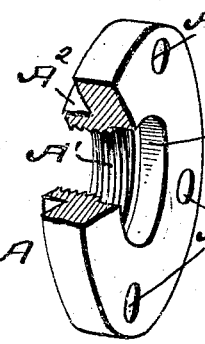
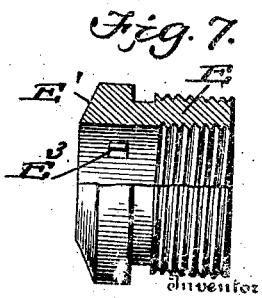
Witnesses
F. Haus.

UNITED STATES PATENT OFFICE.

FRANK HAUS, OF METROPOLITAN, NEW YORK.

PIPE-COUPLING.

No. 870,557.　　　Specification of Letters Patent.　　　Patented Nov. 12, 1907.

Application filed June 30, 1904. Serial No. 214,774.

*To all whom it may concern:*

Be it known that I, FRANK HAUS, a citizen of the United States, residing at Metropolitan, in the borough of Queens and State of New York, have invented a new and useful Improvement in Pipe-Couplings, of which the following is a specification.

This invention relates to an improvement in pipe couplings and has for its object to provide a cheap and simple, but highly efficient device for uniting the abutting ends of pipes.

Another object of my invention is to provide a device that is capable of adjustment so that the meeting ends of two pipes may be securely united should they be of greater or less length than is actually required for a fitting.

The invention also comprises certain details of construction and novelties of combination and arrangement as will be particularly described in the following specification and pointed out in the claims, reference being had to the drawings, in which:

Figure 1 is a perspective view illustrating the practical application of my invention. Fig. 2 is a sectional view of the same. Figs. 3 and 4 are detail views in perspective of the cast-iron flanges partly broken away. Fig. 5 is a sectional elevation of one of the brass seats. Fig. 6 is an end view of the same. Fig. 7 is a sectional elevation of the co-acting seat and, Fig. 8 is an end view of the same.

In carrying out my invention I employ two cast-iron collars A, and B, each having a left hand threaded opening A′, and B′, cut centrally therein and surrounding the threaded opening and upon the outside of each collar I provide a boss $A^2$, and $B^2$. The collar B, is provided with four non-circular bolt openings $B^3$, and the collar A, is provided with a similar number of circular openings $A^3$, which are in line with the openings $B^3$, and through which project bolts C, each having a non-circular portion arranged adjacent its head, and each having a nut C′, operating on its free end.

Fitting in the threaded opening of the collar A, is a brass ring or seat D. which is provided exteriorly for a portion of its length, with a left hand thread to engage the left hand thread of the collar A, and interiorly with a right hand thread into which is adapted to screw the one end of a pipe P. This ring or seat is also provided with a shoulder D′, at one end which is adapted to fit within the recess $A^4$, formed in the inner face of the collar and the outer face of the ring is beveled as at $D^2$, to provide a bearing surface for the beveled bearing surface E′, of the ring or collar E, which is similar, in other respects to the ring or seat B; and which is adapted to screw into the thread portion of the collar B. This ring E, is also provided with an interior right hand threaded end into which screws the abutting end of a pipe section P′.

The rings or seats D, and E, are provided upon their interior with short studs or projections $D^3$, and $E^3$, respectively which provide a gripping surface for a wrench, or other tool which facilitates each ring being quickly and easily adjusted into position.

In operation the rings or seats are first screwed into its respective collar and the ends of the pipes are then screwed into the rings, the bolts are then inserted through the openings in the collars and by screwing up the nuts, the collars are drawn together which brings the beveled face of one ring into contact with the beveled face of the other ring, and by tightly adjusting the nuts a firm tight joint or union is established between the pipes.

From the foregoing it will be readily seen that I provide an exceedingly cheap and simple device that is capable of quick adjustment and by constructing the rings of brass a tight union is formed and the necessity of using rubber or other forms of gaskets is avoided.

Of course it is understood that both the beveled faces of the rings are ground to provide perfectly smooth surfaces.

Having thus fully described my invention, what I claim as new and desire to secure by Letters Patent is:—

A pipe coupling comprising iron collars having bolt openings, said collars having bosses on their outer faces, and being interiorly threaded, oppositely beveled brass seats fitting in said collars, said seats having exterior and interior threads, inwardly extending studs carried by the seats and bolts connecting the collars.

FRANK HAUS.

Witnesses:
　FRED W. V. LEHMANN,
　W. M. MILLER.